Dec. 18, 1962     G. R. REED     3,068,663
FLEXIBLE COUPLING
Filed May 3, 1960
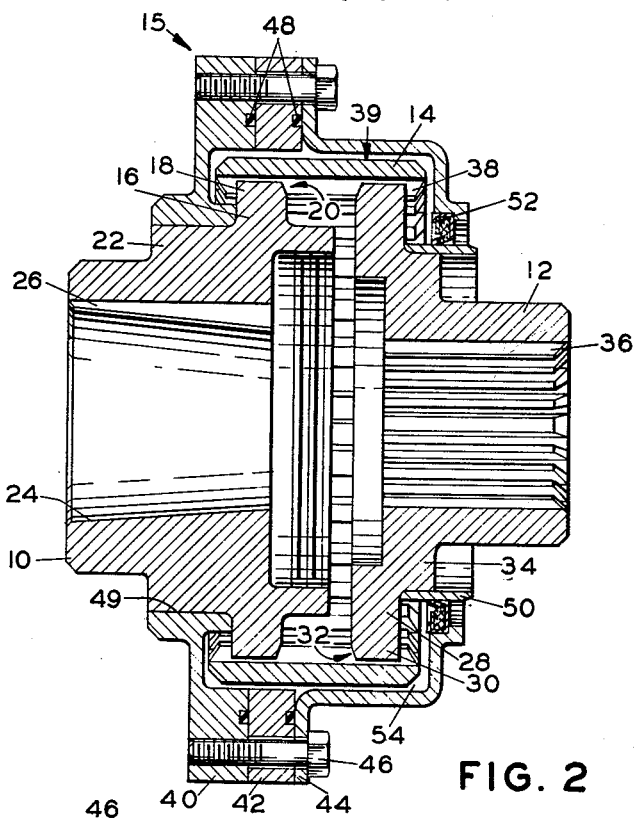
FIG. 2
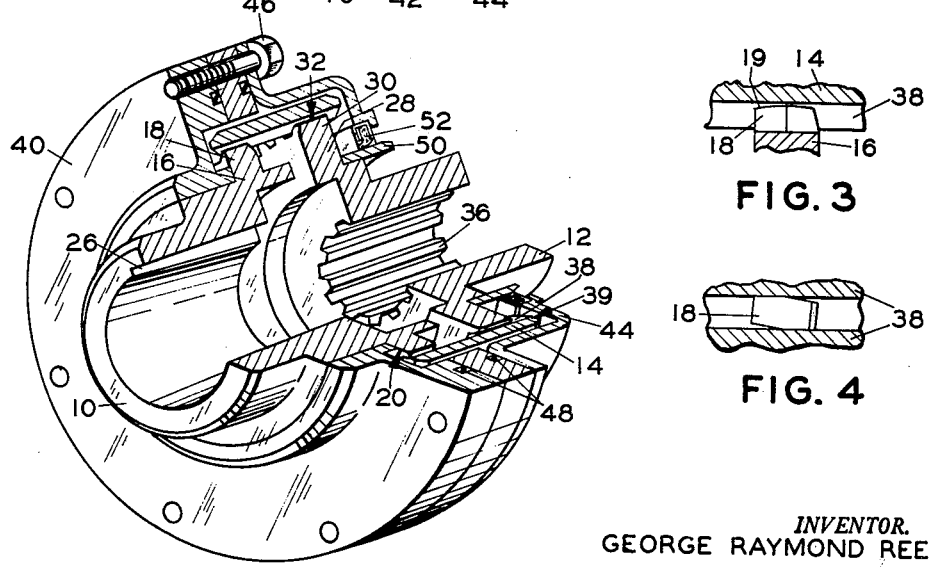
FIG. 3
FIG. 4
FIG. 1
*INVENTOR.*
GEORGE RAYMOND REED
BY *Walter E. Pawlick*
ATTORNEY

United States Patent Office 3,068,663
Patented Dec. 18, 1962

3,068,663
FLEXIBLE COUPLING
George Raymond Reed, Lambertville, Mich., assignor to Dana Corporation, Toledo, Ohio, a corporation of Virginia
Filed May 3, 1960, Ser. No. 26,571
5 Claims. (Cl. 64—9)

This invention relates to flexible couplings in general, and more particularly to a flexible gear tooth coupling having a pair of geared hub elements which cooperate with an internally toothed floating element for the transmission of power from one rotating shaft to another.

Previously, flexible couplings utilized a sealing means attached in one way or another to a sleeve which connects a pair of universally mounted hub elements. The sealing means usually is positioned between the sleeve and a two piece cover to prevent leakage through the cover. With this type of arrangement, the continually changing bearing pressure condition resulting from misalignment of the shafts relative to the sleeve gradually wears away the seals. This means undesirable time, trouble and expense to replace the sealing means.

Furthermore, since both hub elements are universally mounted with respect to the cover means, sealing means must necessarily be provided between each hub member and the cover.

Other prior devices have employed a sleeve integral with the cover or another part of the case. However, this results in lack of freedom of movement of the parts within the cover and causes excessive wear due to binding or slipping.

It is because of these deficiencies in the prior art that the present flexible coupling has been developed wherein the sleeve is completely free from engagement with the sealing means and is universally or floatingly mounted for movement in any direction within the cover means. Furthermore, only one of the hub members is universally mounted relative to the casing, thereby eliminating a sealing means between the cover and the other hub member.

It is accordingly an object of this invention to provide a flexible gear tooth coupling wherein the sealing means is completely independent of the sleeve.

Another object of this invention is to universally or floatingly mount a sleeve member for limited movement in any direction within the cover means to prevent binding or slipping and increase the angular displacement or misalignment at which the power shafts may operate.

A further object of this invention is to fixedly mount the cover to one of the hub members while the other is universally mounted relative thereto, thus eliminating the necessity of a sealing means between the one hub and the cover.

Other objects and advantages of this invention will become apparent from the following detailed description when taken in connection with the accompanying drawings wherein:

FIG. 1 is a perspective view, partially in section, illustrating one preferred embodiment of this invention.

FIG. 2 is a longitudinal sectional view of the coupling shown in FIG. 1.

FIG. 3 is a side elevation view of the tooth form utilized in the coupling.

FIG. 4 is a plan view of the tooth form shown in FIG. 3.

Referring more particularly to the drawings, a flexible gear tooth coupling is illustrated which is adapted to transmit power between a pair of rotating shafts. The principal power transmitting elements of the flexible gear tooth coupling comprise a pair of normally axially aligned hub members 10 and 12, a coupling means or outer sleeve member 14, and a cover 15.

Disposed on the inner end of the hub member 10 is an external annular rib 16 on the periphery of which are gear teeth 18. As shown in FIGS. 3 and 4, the gear teeth 18 have a spherical crown 19 and the medial portion of the sides of the teeth are of greater thickness than the end portions thereof. The rib 16 and gear teeth 18 are conveniently referred to as an inner gear 20. Positioned axially outwardly on the hub 10 from the rib 16 is an elongated annular shoulder 22 which is adapted to rigidly mount an annular member 40 on the hub member 10. Centrally located in the hub member 10 is a tapered bore 24 which is adapted to receive a tapered power shaft (not shown). A keyway 26 is provided in the hub member 10 to lock the power shaft in place.

The hub member 12 is generally similar to the hub member 10 and accordingly has an external annular rib 28 with teeth 30 on the periphery thereof constituting an inner gear 32. The gear teeth 30 are identical to the gear teeth 18 shown in FIGS. 3 and 4. Positioned axially outwardly on the hub member 12 from the rib 28 is an annular shoulder 34 which is somewhat shorter than the elongated shoulder 22 of hub member 10. A spline bore 36 is centrally located in the hub 12 for receiving a splined second power shaft (not shown).

Surrounding the inner gears 20 and 32 and coupling the same is the tubular sleeve 14 on the inner wall of which are formed conventional elongated gear teeth 38 which mesh with the teeth 18 and 30 of the inner gears 20 and 32. The sleeve member 14 and teeth 38 thereon are, for convenience, termed an outer gear 39.

A casing or cover means 15 surrounds the outer gear 39 and is universally mounted on the hub member 12 and rigidly secured to hub member 10. The cover means takes the form of a pair of annular members 40 and 44 having an adapter plate 42 positioned therebetween. The annular members 40 and 44 and adapter plate 42 are suitably secured together as a unit by a plurality of hex head machine screws 46 spaced about the outer periphery thereof. Alternatively, the adapter plate 42 may be omitted or replaced with a fan element (not shown) as may be required in some installations. To prevent the escape of lubricant between the annular members 40 and 44 and the adapter plate 42, the outer periphery of the annular member 40 and the adapter plate 42 are provided with annular recesses slightly inwardly from the connecting machine screws 46. The annular recesses receive any suitable sealing means 48. It should be particularly pointed out that the sealing means 48 is completely independent of the sleeve 14 and thus is less subject to wear.

The inner portion of the annular member 40 is provided with an elongated axially extending flange 49, which is press fitted onto the annular shoulder 22 of hub member 10 to securely mount the same. It is obvious that other means such as screws, may be employed to rigidly mount the annular member 40 to the hub 10.

Means is provided to universally mount the hub member 12 for movement relative to the cover means. To this end, a cylindrical bearing member 50 is press fitted on the shoulder 34 of the hub 12. For the purpose of preventing external leakage of lubricant between the hub member 12 and the cover means, an annular sealing element 52 is suitably secured to the internal periphery of the annular member 44 and engages the cylindrical bearing member 50. The sealing element 52 is preferably made of a compressible fibrous material so as to permit relative movement between the cover means and the hub member 12 while maintaining a fluid tight seal therebetween.

The cover means and the hubs 10 and 12 cooperate to define a chamber 54 in which lubricant is sealingly entrapped. The sleeve member 14 or outer gear 39 is slightly smaller in size than the chamber 54 and is thus universally or floatingly mounted for limited movement in any direction therein. This universal or floating mounting of the sleeve member 14 coupled with the particular tooth form of gear teeth 18 and 30 as shown in FIGS. 3 and 4, permits rocking movement of the sleeve member during angular misalignment of hubs 10 and 12 and doesn't disturb the transmission of power from one shaft to the other. As a result, there is little backlash and binding, which are undesirable features common in flexible couplings heretofore.

In operation, when a shaft (not shown) which is keyed to hub 10 is rotated, it will drive the inner gear 20; its teeth 18, in mesh with the teeth 38 of the outer gear 39, drive the latter; the teeth 38 of the outer gear 39 are in mesh with teeth 30 of the inner gear 32 and drive the hub 12; the inner gear 32 will drive a shaft (not shown) which is splined to hub 12 to fulfill the transmission of power.

Upon misalignment of the power shafts the hub member 12 will pivot about its universal mounting in the cover means 15 and the outer gear 39 will rock within the chamber 54. Thus, power continues to be transmitted between the hub 10 and the hub 12 without interruption.

While only a single embodiment of this invention has been shown and described, it is apparent that there be many changes in structure as well as operation without departing from the scope of this invention as defined by the appended claims.

I claim:

1. A flexible shaft coupling for transmitting rotation from one shaft to another, comprising a pair of rotatable hub members each adapted to be connected to one of the shafts, cover means rigidly secured to one of said hub members and the other of said hub members being universally mounted in said cover, a sleeve element normally concentric with and surrounding a portion of each of said hub members, and intermeshing teeth on said sleeve and said hub members, said sleeves being floatingly mounted for movement in any direction within said cover means whereby power is transmitted between said hub members during relative angular displacement thereof.

2. A flexible shaft coupling of claim 1 including sealing means interposed between said universally mounted hub member and said cover to entrap a lubricant.

3. A coupling device comprising substantially coaxial driving and driven hub members each having external teeth thereon, a floating sleeve having internal teeth meshing with said hub teeth, said hub teeth having a curved crown and the medial portion of the sides thereof being of greater thickness than the end portions whereby power is transmited from one of said hub members to the other while permitting misalignment thereof, and cover means being rigidly secured to one of said hub members and universally secured to the other of said hub members, said cover means completely enclosing said sleeve while permitting free movement of the same in any direction within said cover means.

4. A coupling device comprising in combination, a first member having external teeth thereon, a second member having external teeth thereon and being disposed in spaced relationship with said first member, a sleeve member having internal teeth therein meshing with the teeth of said first and second members for transmitting torques therebetween, and cover means for said members, said cover means being constructed of a plurality of interconnected sections, sealing means interposed between each of said plurality of sections, one section of said cover means fixedly secured to one of said members while another section of said cover means being universally mounted on the other of said members.

5. A coupling device comprising in combination, a first member having external teeth thereon, a second member having external teeth thereon and being disposed in spaced relationship with said first member, a floating sleeve having internal teeth meshing with the teeth of said first and second members for transmitting torque therebetween, said teeth on said first and second members having a curved crown and having the medial portion of their sides of greater thickness than the end portions thereof whereby said members may move universally relative to said sleeve member, and cover means being rigidly secured to one of said members and universally secured to the other of said members, said cover means completely enclosing said sleeve while permitting free movement of the same in any direction within said cover means.

References Cited in the file of this patent

UNITED STATES PATENTS

| | | |
|---|---|---|
| 1,200,475 | Erickson | Oct. 10, 1916 |
| 1,721,060 | Swartz | July 16, 1929 |
| 2,035,434 | Loewus | Mar. 24, 1936 |
| 2,055,014 | Manger | Sept. 22, 1936 |